(12) United States Patent
D'Amelio et al.

(10) Patent No.: US 12,147,007 B2
(45) Date of Patent: Nov. 19, 2024

(54) DEVICE FOR MEASURING THE PERCEIVED TEMPERATURE

(71) Applicant: THINXS S.R.L., Bari (IT)

(72) Inventors: Carlo D'Amelio, Capurso (IT); Luigi Buttiglione, Bari (IT); Alessandro Iossa, Massa Lubrense (IT); Stefano Re Florentin, Turin (IT)

(73) Assignee: THINXS S.R.L., Bari (IT)

( * ) Notice: Subject to any disclaimer, the term of this patent is extended or adjusted under 35 U.S.C. 154(b) by 670 days.

(21) Appl. No.: 17/413,827

(22) PCT Filed: Dec. 18, 2019

(86) PCT No.: PCT/IB2019/061039
§ 371 (c)(1),
(2) Date: Jun. 14, 2021

(87) PCT Pub. No.: WO2020/128916
PCT Pub. Date: Jun. 25, 2020

(65) Prior Publication Data
US 2022/0066067 A1    Mar. 3, 2022

(30) Foreign Application Priority Data
Dec. 21, 2018    (IT) .................. 102018000020629

(51) Int. Cl.
*G01W 1/17*    (2006.01)
*G01K 1/08*    (2021.01)
*G01K 7/42*    (2006.01)

(52) U.S. Cl.
CPC ............. *G01W 1/17* (2013.01); *G01K 1/08* (2013.01); *G01K 7/427* (2013.01)

(58) Field of Classification Search
CPC ............ G01W 1/17; G01K 1/08; G01K 7/427
See application file for complete search history.

(56) References Cited

U.S. PATENT DOCUMENTS 3,751,634 A * 8/1973 Madsen ................. G01K 17/00
374/E1.001
4,125,012 A * 11/1978 Madsen ................. G01N 25/18
374/45
4,702,617 A * 10/1987 Crabtree ................. G01W 1/17
708/445
4,747,699 A * 5/1988 Kobayashi ............. G01W 1/17
374/9

(Continued)

Primary Examiner — Nathaniel T Woodward
Assistant Examiner — Philip L Cotey
(74) Attorney, Agent, or Firm — R. Ruschena Patent Agent, LLC

(57) ABSTRACT

Device (S) for measuring the perceived temperature of an environment comprising: at least one first sensitive element (1), exposed to the environment for which the perceived temperature is to be estimated, configured to be supplied with a variable power, so as to dissipate a thermal power equal to the power that would be dissipated by conduction, convection and radiation from the human skin exposed to the same environment; means for measuring the temperature of said first sensitive element (1); calculation and control means (8); electrical supply means controlled by said calculation means (8) and adapted to supply said sensitive element (1) with an electrical power determined by said calculation and control means (8).

16 Claims, 7 Drawing Sheets

(56) References Cited

U.S. PATENT DOCUMENTS

| | | | | |
|---|---|---|---|---|
| 4,964,115 A * | 10/1990 | Tajima | ................... | G05D 23/24 |
| | | | | 236/44 E |
| 5,102,230 A * | 4/1992 | Kobayashi | .............. | G01W 1/17 |
| | | | | 374/142 |
| 5,170,935 A * | 12/1992 | Federspiel | ................ | F24F 11/63 |
| | | | | 236/94 |
| 5,333,953 A * | 8/1994 | Kon | ........................ | G01W 1/17 |
| | | | | 702/136 |
| 2002/0167990 A1 * | 11/2002 | Rengshausen | .......... | G01W 1/17 |
| | | | | 374/164 |
| 2005/0126280 A1 * | 6/2005 | Canta | ..................... | G01W 1/17 |
| | | | | 73/204.11 |
| 2012/0232715 A1 * | 9/2012 | Vass | ........................ | G01W 1/17 |
| | | | | 702/130 |
| 2020/0346517 A1 * | 11/2020 | Han | ........................ | B60H 1/034 |
| 2022/0264964 A1 * | 8/2022 | Matsuoka | ................ | A61B 5/01 |

* cited by examiner

FIG. 1
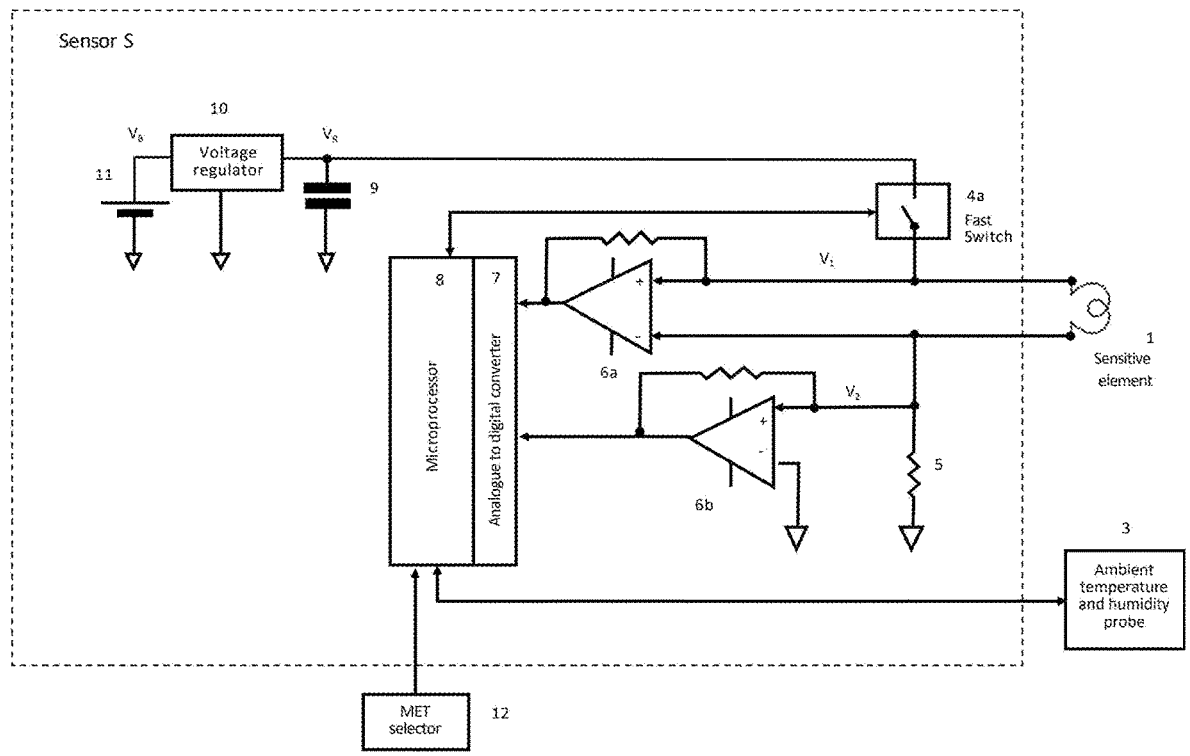
FIG. 2 -a
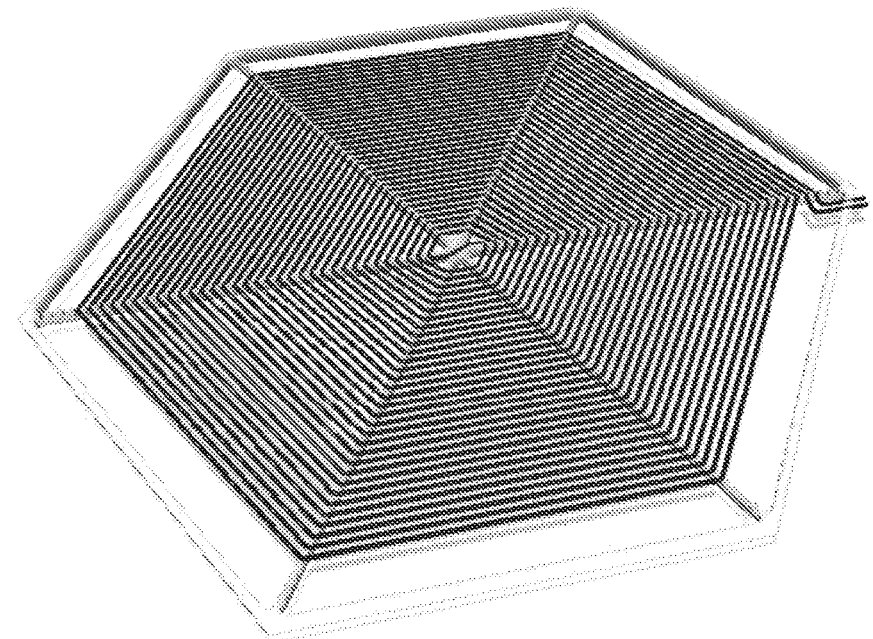

FIG. 2-b
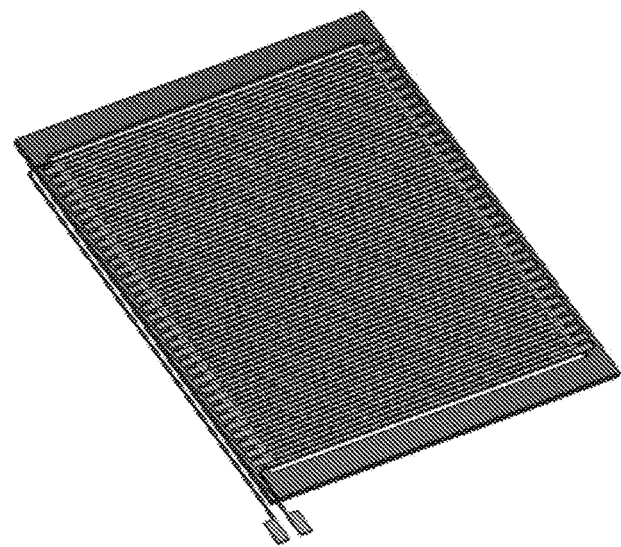
FIG. 3
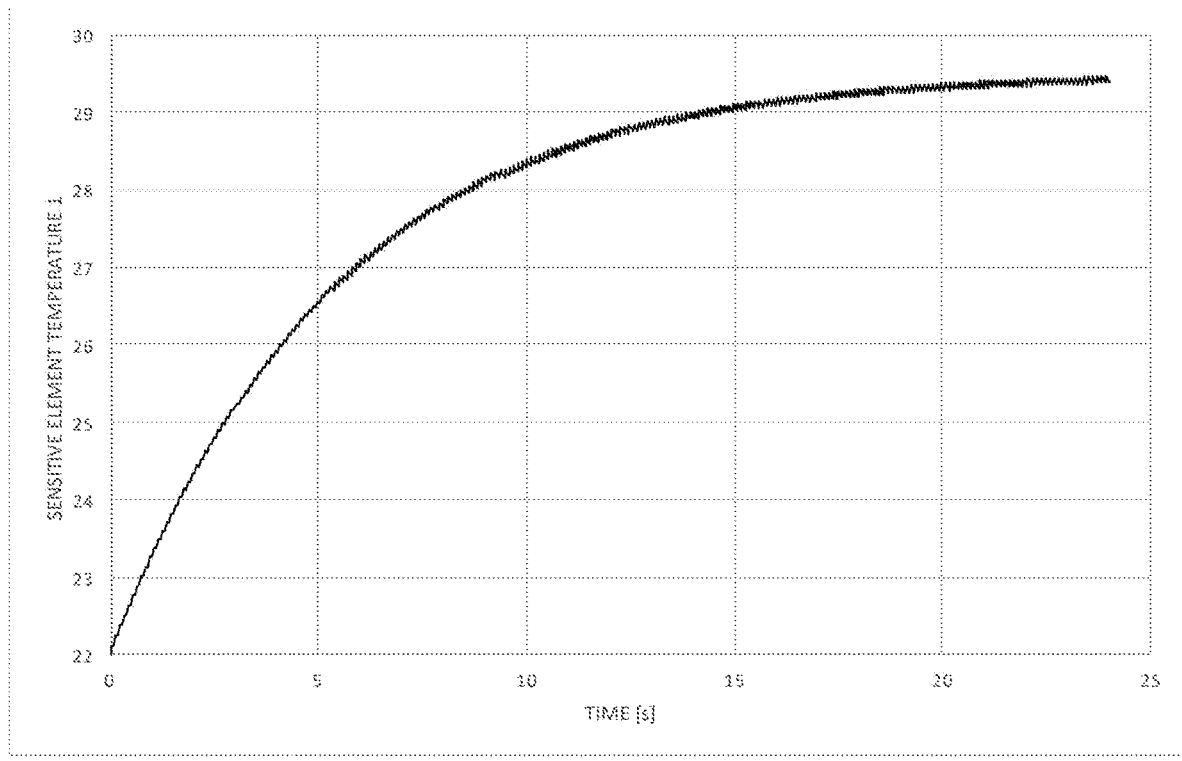

FIG. 4
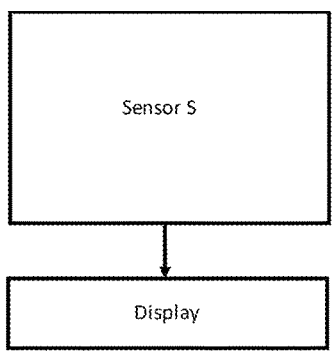
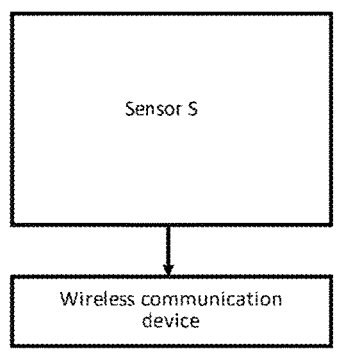
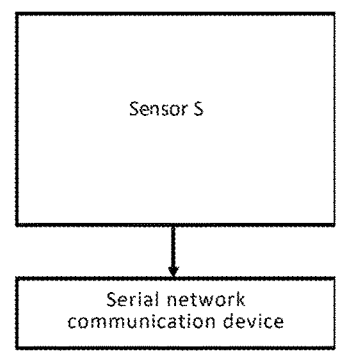
FIG 4a      FIG 4b      FIG 4c

DEVICE FOR MEASURING THE PERCEIVED TEMPERATURE

The present patent application for industrial invention relates to a device for measuring the perceived temperature.

TECHNICAL FIELD OF THE INVENTION

The "perceived temperature" is defined as the temperature of that isothermal environment with still air and relative humidity of 50% (hereafter also "reference environment") that would give to a human being present there the same thermal sensation of the ambient to which he is really exposed. This sensation derives from the ambient temperature, from the mean radiant temperature, from the relative humidity and from the air velocity.

The perceived temperature is the most suitable quantity to refer to for the adjustment of the microclimate in order to obtain the thermal comfort of the premises, both in the field of transports (cars, buses, trains, etc.) and in the field of premises dedicated to residential or industrial use.

Several correlations are known in the scientific literature between the sensation of thermal comfort/discomfort and environmental parameters (eg Fanger, etc.), and in particular between the sensation of comfort and skin temperature. The heat exchange between the environment and the skin dissipates, in fact, most of the thermal power produced by the metabolism. With the same metabolic conditions, the skin temperature is determined by the heat exchange towards the environment, which occurs through three ways:
  i) conductive/convective heat exchanges determined by air temperature and velocity;
  ii) evaporative/by perspiration heat exchanges determined by air temperature and humidity;
  iii) radiative heat exchanges determined by the thermal differential between the temperature of the skin and the mean radiant temperature of the surrounding surfaces.

The metabolic power of the human body is practically independent of environmental conditions and depends on the level of physical activity and partially by the constitution of the subject. This means that, for a given subject, the temperature of the skin, with a fixed metabolism and clothing, depends on the power dissipated towards the external environment. The more intense the heat exchange with the environment, the lower the skin temperature and vice versa.

The power generated by the metabolism and dissipated through the skin has been the subject of scientific measurements and is indicated by a special scale (MET). In conditions of absence of physical activity (sitting posture with straight back) MET parameter conventionally assumes the value of 1, corresponding to 5,825 mW/cm$^2$.

BRIEF DESCRIPTION OF THE PRIOR ART

Some examples of integrated sensors for evaluating thermohygrometric comfort are known. A first example is described in document EP0526425 which however describes a device with architecture of the sensitive element different from the one below, also the device described therein is unable to consider the contribution of perspiration in the heat exchange. A second example is reported in EP156000, which describes a system comprising two variable resistors as a function of temperature, one of which is shielded from radiation and air flow. As will be shown, the device according to the present invention differs from this system both in terms of the architecture of the sensitive element (which is active, i.e. power supplied) and the measurement principle.

Further documents are known which describe devices for determining thermohygrometric comfort which are based on the measurement of environmental parameters. Some examples are contained in documents U.S. Pat. No. 5,374,123, US 2012232715, CN 202582608, DE 19822102, CN 204085569, GB1357177A, EP0495117A1.

Technical Problem to be Solved

To the best of the knowledge of today's inventors, all known devices have high thermal inertia with consequent lengthening of measurement times and loss of sensitivity. No device has yet managed to achieve adequate performance for a widespread introduction on the market. These limitations lie in the embodiment of the sensitive element, which must be characterized by low thermal inertia.

Object of the Invention

According to a first object, the present invention intends to provide a sensor that measures the temperature that human skin would assume if subjected to the same conditions of ambient air temperature, mean radiant temperature, relative humidity and air velocity to which the sensor is subjected.

According to another object, the invention object of the present invention intends to provide a sensor for estimating the perceived temperature and the sensation of comfort/discomfort by means of the correlation between said sensation and the temperature of the skin.

In particular, the present invention intends to provide a sensor according to the foregoing which overcomes the limitations of the currently known devices, ensuring greater accuracy, lower energy consumption and lower cost.

According to a still further object, the present invention aims to provide a method for measuring the temperature of the skin and for estimating the perceived temperature.

Still, the present invention intends to provide a device comprising a plurality of sensors capable of measuring the perceived temperature in several points of a large environment and characterized by non-uniform thermohygrometric conditions.

Brief Description of the Device

The device (S) according to the present invention comprises:
  at least one first sensitive element (1), exposed to the environment for which the perceived temperature is to be estimated, configured to be supplied with a variable power, so as to dissipate a thermal power equal to the power that would be dissipated by conduction, convection and radiation from the human skin exposed to the same environment
  means for measuring the temperature of said first sensitive element (1),
  calculation and control means (8),
  electrical supply means controlled by said calculation means (8) and adapted to supply said sensitive element (1) with an electrical power determined by said calculation and control means (8);
  at least one second sensitive element (3), configured to measure the temperature and the relative humidity of the ambient air, able to allow said calculation means (8)

to estimate the thermal powers per unit area that would be exchanged between skin and ambient through transpiration and exudation, in order to determine by complement with the metabolic power per unit area— the power per unit area to be supplied to the sensitive element (1);

said device (S) characterized in that:
said sensitive element (1) consists of a thermoresistance having a thin planar shape and configured to measure of its own temperature by means of its Temperature Coefficient of Resistance (TCR)

and from the fact that:
said thermoresistance consists of a metal element having a sufficiently high TCR;
said thermo-resistance has both sides directly facing the external environment.

Detailed Description of the Measurement Procedure

It is assumed that, in the method according to the present invention, the perceived temperature is defined as the temperature of an isothermal environment, with calm air and relative humidity of 50%, which would originate the same skin temperature originated from the environment under investigation. This operational definition of perceived temperature, based on physically measurable quantities, allows an objective and scientifically based estimate of the same.

The procedure adopted for estimating the perceived temperature on the basis of the principle illustrated above is described below, with reference to FIG. 1.

The first step of this procedure consists in estimating the average temperature that the skin of a human being placed in the environment under examination would assume.

Reference is made to the average skin temperature of a human being since the metabolic power per unit area indicated by the MET value is the average surface power of the metabolism.

It is known that the temperature of the skin depends on the clothing, which constitutes an uncontrollable exogenous variable. However, the measuring principle adopted by the present invention makes the estimation of the perceived temperature independent of the clothing. In fact, the sensor object of the present invention is aimed at estimating the temperature of the reference environment which would make the temperature of the skin equal to that actually observed, regardless of its absolute value and therefore independently of the clothing.

In fact, by virtue of the definition of "reference environment", the temperature of the dressed skin has increased compared to the temperature of the bare skin by an amount that assumes the same value both in the real environment and in the "reference" environment. Once the thermal resistance of the clothing has been fixed, it follows that this entails an increase in the temperature of the skin that does not influence the estimation of the perceived temperature.

It should be noted that, always on average over the whole human body, the temperature of the heat exchange surface towards the external environment is the same both in the presence of clothing and in its absence; otherwise said, bare skin or outer surface of the clothing assume the same temperature.

It is also known that the skin temperature depends on the metabolic power, designated by the MET parameter. Also in this case, as a first approximation, the considerations previously made for clothing could be adopted. In this case, however, as the MET changes, the temperature of the heat exchange surface with the environment increases, be it bare skin or clothing, and therefore there are effects, even if small, due to the dependence of the parameters that govern the physical laws of heat exchange from surface temperature.

In order to take account of these effects of the second order, the device (S) preferably comprises a selector (12) that allows the user to select the desired MET value. For example, for an office, a means of transport or a dwelling where people do not perform physical activity, the most suitable value of MET will be 1. Said selector (12) also allows a customization of the metabolic rate in order to adapt the personal sensitivity to the thermohygrometric conditions. It communicates with said calculation means (8), which are able to acquire the MET value selected by the user. The MET value will be used by said calculation means (8) for determining the metabolic power per unit area Qa that must be dissipated by the skin, by means of the following equation:

$$Q_a = \text{MET} \cdot 5{,}825 \text{ mW/cm}^2 \tag{Eq. 1}$$

Once the metabolic power (Qa) has been defined, the first sensitive element (1) is supplied with a thermal power per unit area as determined by the equation 1, to which, however, the contribution of evaporative/by perspiration heat exchanges is subtracted. Obviously, the greater the absolute power supplied to the sensitive element, the bigger the surface of the same.

Preferably, the device also comprises personalization means that allow the user to modify, by adding an offset and/or with a multiplicative factor, the metabolic power determined according to the foregoing. This also allows those who are comfortable in thermohygrometric conditions other than those preferred by most individuals to operate the device optimally.

The thermal power heats up the sensitive element (1) until it reaches an equilibrium temperature with the environment. The equilibrium temperature obviously does not depend only on the thermal power but also (and above all) on the environmental conditions. However, the temperature that would reach the sensitive element (1) in conditions of equilibrium would not be the sought-after temperature of the skin since the sensitive element (1) does not make the evaporative/by perspiration heat exchanges typical of the skin.

On the contrary, the conductive/convective and radiative exchanges of the skin with the environment are very well approximated by what happens with the sensitive element, since the conductive/convective exchanges depend on a heat exchange coefficient h as a function of temperature and air velocity, and weakly dependent on the shape of the surface, and the radiative exchanges by the emissivity coefficient of the skin, which is replicable by means of suitable coatings or paints.

According to the present invention, therefore, to said sensitive element (1) is required to dissipate only the portion of the thermal power which belongs to the conductive/convective and radiative heat exchanges.

The portion of power that a skin element with a surface equal to that one of the sensitive element (1) would exchange with the environment by evaporation/perspiration is instead estimated by calculation based on the skin temperature itself and on the temperature and relative humidity of the ambient air.

For this purpose, a second sensitive element (3), of itself known, is connected to said calculation unit (8), capable of providing the measurement of the temperature and relative humidity $UR_a$ of the ambient air.

The power per unit area $Q_{trp}$ that would be dissipated from the skin by evaporation/perspiration in the conditions of temperature and humidity of the real environment is calculated using known relationships in the literature, such as the following:

$$Q_{trp}=r\cdot\Pi\cdot(1-UR_a)\cdot(p_{sp}-UR_a\cdot p_{sa}) \quad\text{(Eq. 2)}$$

wherein:
r indicates the latent heat of evaporation of water at the temperature of the human body, equal to $2.41\cdot10^6$ J/kg;
$\Pi$ indicates the permeance of the skin to water vapor, equal to $1.27\cdot10^{-9}$ kg/(m·s·Pa);
$UR_a$ indicates the relative humidity of the air measured by said sensitive element (3);
$p_{sp}$ indicates the saturation pressure of water vapor at the skin temperature;
$p_{sa}$ indicates the saturation pressure of water vapor at room temperature, the latter measured by the second sensitive element (3).

The values of the saturated vapor pressures ($p_{sp}$ and $p_{sa}$) are calculated by said calculation unit (8) by means of a formula, of itself known, capable of providing with adequate precision the saturated vapor pressure $p_s$ as a function of the temperature t, such as for example the following equation 3:

$$p_s=\exp[6.41542+2.302585\cdot t/(31.614894+0.1327603\cdot t+1.5593343\cdot10^{-5}\cdot t^2)] \quad\text{(Eq. 3)}$$

The calculation unit (8) uses the ambient temperature measured by said sensitive element (3) for the determination of $p_{sa}$, while it uses the skin temperature provided by said sensitive element (1) for the determination of $p_{sp}$ according to a recursive process of rapid convergence, described below.

When the sensor is turned on or at the beginning of a new measurement cycle, an initialisation value of the skin temperature ($T_s(i-1)$) is set, depending on the MET value set and the ambient temperature measured by said second element sensitive (3), obtained from suitable tables stored in the calculation unit (8).

By means of equation 2, said calculation unit (8) reaches the determination of Qtrp.

The calculation means (8) then subtract the $Q_{trp}$ value from the power $Q_a$ provided by the relation 1 and multiply the result by the surface A of the sensitive element 1:

$$P_1=A\cdot(Q_a-Q_{trp}) \quad\text{(Eq. 4)}$$

thus obtaining the portion of the metabolic power which must be dissipated by conduction/convection/radiation. This is the power that must be dissipated by said sensitive element (1) so that it reaches the same temperature of the skin and, therefore, this is the power that is supplied (electrically) to the sensitive element (1). The power $P_1$ is iteratively updated by measuring the temperature value of the sensitive element (1) and consequent new estimate of $Q_{trp}$ until its stabilization.

Once the thermal regulation is completed and the iterative calculation converges, said sensitive element (1) reaches a temperature completely equivalent to the temperature that would be assumed by bare skin exposed to the same environmental conditions. The procedure just described is outlined in the flow chart of FIG. 8, in which it is shown how the temperature of the skin is determined ($T_{skin}=T_s(i)$).

Brief Description of the Method

The method for measuring the perceived temperature by means of the device just described comprises the steps of:

(10) Measure the ambient air temperature ($T_{amb}$) and the relative ambient humidity ($UR_a$) by means of the said second sensitive element (3);
(20) Estimate the total specific power ($Q_a$) dissipated by the skin as a function of the metabolic activity and as a function of the value set by said personalization means
(30) Estimate the specific power dissipated by the skin by evaporation/perspiration ($Q_{trp}$) as a function of:
the ambient temperature ($T_{amb}$) measured at point (10),
the relative ambient humidity ($UR_a$) measured in point (10),
the temperature ($T_s$) of said first sensitive element (1);
(40) Powering said first sensitive element (1) with a specific power equal to the difference between said specific powers ($Q_a$, $Q_{trp}$) calculated at points (10) and (20);
(50) Measure the temperature ($T_s(i)$) of said sensitive element (1);
(60) Update the estimate of said specific power dissipated through the skin by evaporation/perspiration ($Q_{trp}$) as a function of:
the ambient temperature ($T_{amb}$) measured at point (10),
the relative ambient humidity ($UR_a$) measured at point (10),
the temperature ($T_s(i)$) of said sensitive element (1) measured at point (50).
(70) Repeat steps (40) to (60) until the convergence of the value of said temperature ($T_s(i)$) of said first sensitive element (1), thus determining the temperature of the skin ($T_{skin}=T_s(i)$);
(80) Estimate the specific power exchanged for evaporation/perspiration from the skin exposed to the reference environment ($Q_{trp2}$) as a function of:
the ambient temperature ($T_{amb}$) measured at point (10),
the relative humidity assumed equal to 50%;
the skin temperature ($T_{skin}$) determined at point (70)
(90) Determine the specific power ($P_2$) that would be dissipated in the reference environment by conduction, convection and irradiation as the difference between the specific powers ($Q_a$, $Q_{trp2}$) estimated at points (20) and (80).
(100) Estimate the value of the perceived temperature ($T_p$) as a function of the specific power (P2) calculated at point (90) and of said skin temperature ($T_{skin}$) calculated at point (70).

BRIEF DESCRIPTION OF THE DRAWINGS

The invention will now be described with reference to the attached drawings, which illustrate some non-limiting examples of embodiments, wherein:

FIG. 1 shows the procedure adopted for estimating the perceived temperature and the relative means for regulating the parameters of the procedure itself, FIG. 2-a is a 3-D view of the sensitive element in the form of planar spiral of the wire wound, FIG. 2-b shows a second possible alternative realization of the shape of the sensitive element that is characterized by being made from thin metal sheet suitably laser cut or sheared according to interdigitated geometries, FIG. 3 shows a heating transient, with the temperature trend over time, of the wire of which the sensitive element is composed, FIG. 4 shows means of communication to the user of the value of the perceived temperature, the values of ambient temperature and humidity measured by the sensitive element, said means may comprise a display (FIG. 4-*a*) connected to the processing unit of the sensor or may include a wireless communication system, e.g. via wifi, bluetooth, zigbee, etc. (FIG. 4*b*), e.g. via wired serial network (FIG. 4*c*).

DETAILED DESCRIPTION OF THE DEVICE

Figure 5:
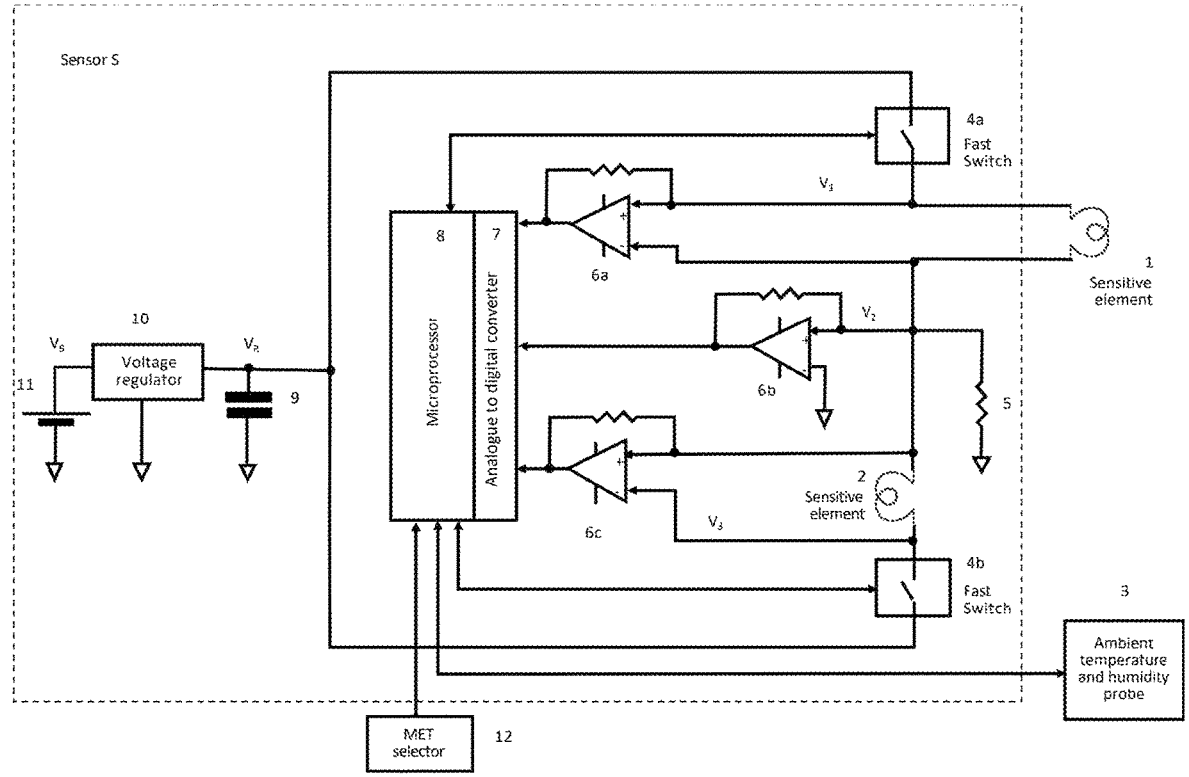
FIG. 5 shows an alternative embodiment of the device, in which the sensor object of the present invention can estimate the perceived temperature using a third sensitive element (2) which is completely identical to the sensitive element (1), in place of using the calculation and interpolation table.

According to a preferential embodiment of the present invention, the sensitive element (1) consists of a thermoresistance in the form of a metal conductor, or in another material suitable for the purpose, having known electrical and physical properties, through which it is passed a current capable of dissipating by Joule effect the electric power $P_1$ calculated with the relationship 4. The same thermoresistance allows the measurement of its own temperature by means of its own TCR (Temperature Coefficient of Resistance).

In order to minimize the electrical consumption of the sensor, especially with a battery power supply, the sensitive element (1) must have a heat exchange surface with the environment as limited as possible, since the power $P_1$ is directly proportional to this surface.

Said sensitive element (1), moreover, must be configured so as to exchange heat exclusively with the ambient air in order to avoid parasitic heat dissipation by conduction towards other bodies, thus affecting the measurement of the temperature of the skin. This requirement preferentially leads to excluding contact of the conductor with surfaces other than ambient air, such as supports or substrates. Finally, the thermal capacity of said sensitive element must be as small as possible for the same surface exposed to the environment, in order to ensure small time constants and therefore rapid thermal regulation.

To this end, the present invention provides for the realization of said sensitive element (1) either in the form of a metal wire, suitably shaped and supported, or in the form of a thin metal sheet. This metal element (wire or foil) can conveniently be made of platinum, but also nickel, copper, tungsten, molybdenum and other materials can be suitable. More specifically, said sensitive element is characterized by the fact of (i) being a thermoresistance consisting of a metal element having a sufficiently high TCR, (ii) having a thin planar shape, so as to avoid three-dimensional geometries which, enclosing volumes of air, would increase the thermal inertia of the sensor, (iii) be free of support elements (substrates on which the thin film or thick film resistance could be deposited, or spools on which the metal wire of the thermoresistance could be wound) which would increase the thermal capacity of the sensor, consequently increasing response times. In other words, the fact that the sensitive element is free of support elements is equivalent to saying that the thermoresistance has both sides directly facing the external environment. The typical values of the surface/volume ratio are positioned in the range $10 \div 50$ mm$^{-1}$. The resistance value must be suitable for the functions that the sensor must perform and therefore is positioned in the range $1 \div 100$ ohm.

Conveniently, the temperature measurement of the sensitive element (1) can be carried out by measuring the electrical resistance of the wire or foil during the passage of the current that heats it up. The measurement of the resistance of said metal element which constitutes said sensitive element (1) is obtained by the jointly measurement of the voltage falling across its terminals and the current that runs through it. These quantities are also used by the calculation unit (8) to control the power supplied.

Diameter and length of the wire, or thickness, width and length of the foil, must be chosen in order to best meet the requirements set out above as well as in order to guarantee a sufficiently low measurement error of the absolute temperature of the sensitive element, for example lower or equal to 0.1° C., compatibly with the technological repeatability of realization of the sensitive element itself.

As an illustrative but not limiting example, in the case of platinum, whose temperature coefficient is equal to about 0.0039, the relative error $\Delta R/R$ of realization of the resistance of the sensitive element (1) must therefore be less than 0.00039 (3.9 parts per ten thousand).

Given the good repeatability of the composition of the platinum and therefore of its temperature coefficient, subject to specific regulations, the precision of realization of the resistance of said sensitive element, in the case of wire, essentially depends on the precision with which its length is made. For example, if the technological precision header of said wire terminals on the main conductors is of the order of tenths of a millimeter, the total length L of said wire, in the case of realization in platinum, must be such that $\Delta L/L < 0.00039$. Therefore if $\Delta L = 0.1$ mm we obtain $L \geq 256$ mm.

As said, it is useful to try to minimize the time of thermal regulation and, therefore, the relationship between volume and surface. In the exemplary but non-limiting case of cylindrical section wire, the ratio between volume and surface of the wire is proportional to the diameter of the wire itself. It is therefore desirable to use the smallest diameter compatible with the technological limits relating to the realization and shape of the wire.

According to the present invention, the shape to be given to said wire provides the following guidelines in a non-limiting way.

First of all, it is observed that the useful surface of said sensitive element (1), i.e. the surface exposed to the environment, depends on how the wire is wound. It should be noted, in particular, that if the wire is wound according to some geometry, the overlapping of the turns must be avoided in order to maximize the dissipating surface for the same length.

Finally, in choosing the type of winding of said wire, it is necessary to avoid that there is material enclosed by the coils system, not only in the form of a support for the winding but also simply air, such as for example in the case of windings in cylindrical or spherical shape which contain a volume of air inside. This material enclosed within the windings (even if only air) contributes to the thermal capacity of said sensitive element (1) by slowing down its readiness.

Therefore, according to a preferential mode of realization, the sensitive element (1) is realized in the form of a planar winding, consisting for example of concentric coils. In particular, a preferential embodiment consists of a double polygonal spiral winding of a small section metal wire (with a value of the diameter typically in the range between 0.10÷0.05 mm), as shown e.g. in FIG. 2-*a*. This geometry allows to keep the angles that the metal wire assumes within low values, avoiding structural problems, ensures a good effective surface/total surface ratio and has minimal points of contact with the support structure, minimizing dissipation towards the latter. This support structure is realized by means of thin-rays but of adequate depth (as shown in FIG. 2-*a*) and provided with incisions in which it engages the wire in its winding coils. The realization of the winding can adequately be carried out using robotic arms typical of wire-bonding technology.

The use of parallel conductors crossed by current in the opposite direction has the advantage of making its ends available on the periphery of the winding and at the same time minimizing the inductance of the winding itself. The planar winding also has the advantage of being representative of an element of human skin, characterized by surfaces with low curvature.

In the case of a planar winding with adjacent turns, the effective surface for thermal exchange is reduced by a factor of $2/\pi$ in relation to the surface of the bare wire, where $2/\pi$ corresponds to the ratio of twice its longitudinal cross-section and the lateral surface of the bare wire, it being understood that both sides of this planar winding must be exposed to the environment.

A second possible alternative realization of the shape of the sensitive element is characterized by being made from thin metal sheet suitably laser cut or sheared according to interdigitated geometries, as shown in FIG. 2-*b*. The same sheet, after punching or laser cutting, it becomes a track with the shape of a serpentine. The low thickness of the sheet and the minimum track width give the element a resistance value in the specified range.

The sheet, cut as described above, is then locked in an insulating frame along the orthogonal sides to the development of the track, as shown in FIG. 2-*b*. The contact with the frame does not affect the heat exchange because the contact zone is not part of the track and therefore does not heat. The thickness of the metal sheet is typically between 0.10÷0.05 mm.

As an alternative to the adoption of planar windings or thin metal lamellas "stand-alone", the sensitive element (1) can also be integrated into a microelectronic system capable of realizing all or part of the processing by adoption of hybrid technologies that can provide for the realization of the sensitive unit through "wire-bonding"

In the illustrative example of the platinum wire with a length equal to 256 mm, the diameter of said wire can conveniently, but not necessarily, be between 0.04 mm and 0.10 mm. With these diameters, time constants of 60 seconds are obtained.

Still with reference to illustrative, but not limiting, case of a platinum wire with a length of 256 mm and a diameter of 0.04 mm, the wire wound in the form of planar spiral, as shown in FIG. 2-*a*, has the following characteristics: electric resistance at room temperature 21.6 ohm; mass 6.9 mg; thermal capacity 0.90 mJ/K.

Still with reference to said example, assuming for the MET a value of 1, and also assuming that the power dissipated $Q_{trp}$ by evaporation/perspiration is equal to 1,125 mW/cm$^2$, a power of 0.96 mW must be supplied to said sensitive element (1).

As already described, said sensitive element (1), crossed by the current capable of ensuring the delivery of this power, leads itself to an equilibrium temperature that corresponds to the temperature of the skin of a human being exposed to the same environmental conditions.

According to the present invention, the metallic element of which said sensitive element (1) is made must have a coating capable of giving it an average emissivity on the visible-infrared spectrum similar to that one typical of human skin ($\varepsilon$=0.94). This can be done by a suitable painting or by oxidation, passivation, anodizing, etc.

Said metallic element, if in the form of a wire, can also be equipped with the insulating coating used in the usual production processes of insulated electric wires, and the high emissivity coating can be added subsequently to said already shaped wire (spiral, raster, etc.) with the dual purpose of increasing its emissivity and consolidating its shape, acting as a glue.

This filler material, which will typically have a thickness of the order of one hundredth of a millimeter, gives rise to a thermal resistance towards the environment, which in the model of human skin consisting of said sensitive element (1) it plays the same role that clothing plays on man.

However, it has previously been shown that the principle of estimating the perceived temperature on which the present invention is based is not affected by clothing. Therefore, the mentioned coating does not affect the estimate of the perceived temperature.

However, the presence of a coating affects the time constant of the sensor. This effect can be compensated, as described below.

A preferential but non-limiting method is now described, with which the electrical power to be supplied to the sensitive element 1 can be supplied and controlled.

In general, the measurement of the electrical power supplied on an unknown resistive load requires the measurement of the current and voltage at its ends. For this purpose, a precision shunt resistance (5) characterized by a very low thermal coefficient is provided for measuring the current; the voltage drop is measured by means of a suitable detection system (6*b*), the output of which is converted into digital signal from an analog-digital converter (7) which supplies it to said calculation unit (8). The value of the shunt resistance is typically equal to a small fraction of the resistance of the wire from which the sensitive element is made (1), a fraction that can for example be between a fiftieth and a hundredth. Similar means (6-*a*) are provided for measuring the voltage across terminals of said sensitive element (1).

Based on the low values of the power to be supplied to said sensitive element (1), the preferential embodiment of the system for supplying the electric power to the sensitive element (1), according to the present invention, provides for the adoption of the PWM technique (Pulse Width Modulation).

According to this technique, the wire is supplied with a much higher power than the target one for a short period of time, and the operation is repeated after such an interval of time that the average value of the power is exactly as desired. FIG. 3 shows a heating transient of the wire of which said sensitive element (1) is composed according to the example previously illustrated. The advantage of the PWM technique consists in the possibility of delegating all the actuation precision of the power to be supply to said sensitive element (1) to the accuracy of the opening and closing times of the fast switch (4 *a*), consisting of a suitable device in its state solid (made with e.g. CMOS technology), characterized by low impedance in the "closed" condition and high impedance in the "open" condition. Furthermore, the supply voltage of said sensitive element (1) does not need to be adjusted according to the power to be supplied but can be stabilized at a predetermined value (e.g. 1.1 Volt in the example illustrated above).

For this purpose, FIG. 1 shows means (10) suitable for regulating the voltage of a battery (11) to the desired voltage value, and electrical storage means (9) suitable to guarantee constant voltage during the supply period of the power.

In another possible embodiment, the battery (11) can be replaced by a power supply system connected to the network suitable for generating the same voltage.

In order to further decrease the average power dissipated by the sensor (S) object of the present invention (and therefore increase the duration of the supply batteries), the measurement made with said sensitive element (1) can be carried out at predetermined time intervals, for example one or more minutes. If, for example, the measurement interval chosen is 10 minutes, taking into account that the regulation time of the sensitive element (1) is about 60 seconds, the average power is reduced by about one tenth.

In order to improve the rapidity of measurement of the sensor object of the present invention, for the benefit of applications where high readiness is required, such as for example applications in means of transport (e.g. thermal transient in a car having an initial temperature far from comfort conditions), said sensitive element (1) can conveniently use a "warm-up" strategy aimed at significantly accelerating the transient regulation. In a convenient embodiment, said calculation unit (8) with which the sensor (S) is provided can deliver the same amount of energy necessary for the thermal regulation of the sensitive element in a more limited time, by realizing a closed chain control based on the measurement of the temperature derivative of said sensitive element (1).

In detail, a possible embodiment of said control is based on the following steps:
 i) supply of the target power for two PWM cycles, e.g. actuation of two current pulses;
 ii) measurement of the difference in temperatures recorded at the beginning of the two current pulses;
 iii) determination of a temporary power increase to be implemented according to a PID (Proportional-Integrative-Derivative) algorithm with appropriately calibrated parameters;
 iv) implementation of increased power by lengthening the closing interval of the switch 4*a* for a single cycle;
 v) repetition of the process with new execution of two normal cycles of implementation.

Once the regulation has been made, the algorithm will find that it is no longer necessary to increase the power.

Figure 9:
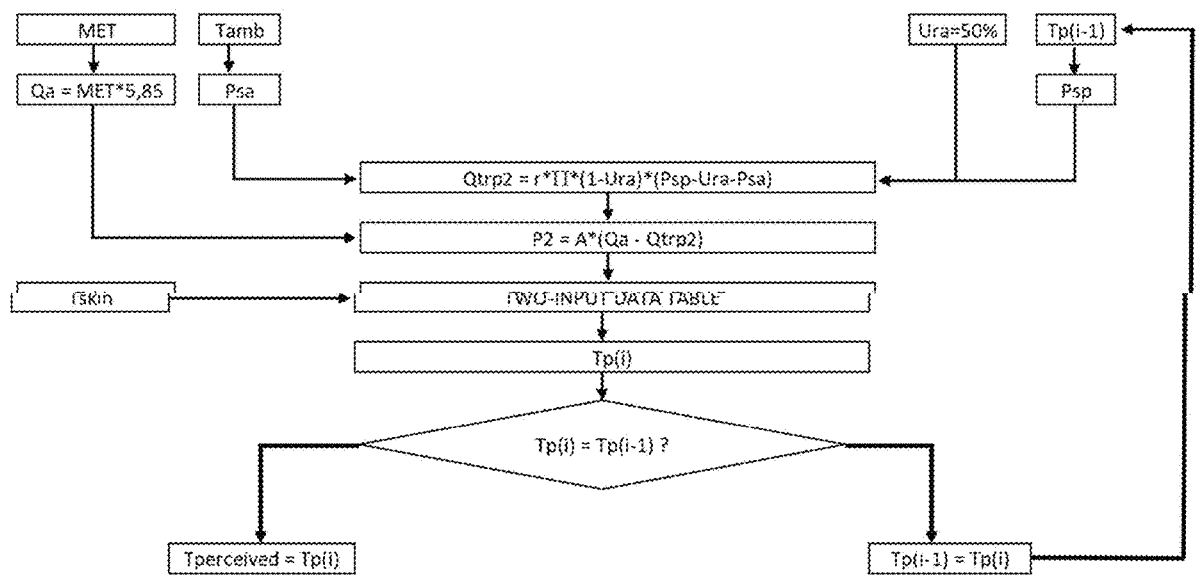
FIG. 9 shows the flow chart of the second step of the procedure implemented by the sensor object of the present invention for the purpose of estimating the perceived temperature consists in estimating the temperature of that "reference environment" which would achieve an equal heat exchange with the human body. Since the temperature of the skin is known as measured by the sensitive element (1) (Tskin=Ts (i)), and all the characteristics of the reference environment are fixed, except for its temperature (zero air velocity, walls isothermal with air, humidity of 50%), the temperature of this environment, corresponding to the perceived temperature, can be determined with this second step of the procedure.

The second step of the procedure implemented by the sensor object of the present invention for the purpose of estimating the perceived temperature consists in estimating the temperature of that "reference environment" which would achieve an equal heat exchange with the human body. Since the temperature of the skin is known as measured by the sensitive element (1) ($T_{skin}$=Ts (i)), and all the characteristics of the reference environment are fixed, except for its temperature (zero air velocity, walls isothermal with air, humidity of 50%), the temperature of this environment, corresponding to the perceived temperature, can be determined with the following procedure, described in the flow chart in FIG. 9.

In the first part of this second step of the procedure, the calculation unit (8) estimates the power per unit area that would compete with the evaporative/by perspiration exchanges for the skin exposed "to the reference environment" ($Q_{trp2}$) using the formula 2, in which it is assumed:
 i) 50% relative humidity ($U_{ra}$);
 ii) skin temperature ($T_{skin}$) measured with said sensitive element (1) according to the previously illustrated procedure;
 iii) ambient temperature equal to estimate of the perceived temperature;

In the first iteration of the calculation, for which a perceived temperature value produced by the previous iteration is not yet available, the ambient temperature provided by the sensitive element (3) is taken as the initialization value.

The power that would be dissipated by conduction/convection/radiation in the "reference environment" shall be determined by means of the following relationship:

$$P_2 = A \cdot (Q_a - Q_{trp2}) \tag{Eq. 5}$$

Given the values of $P_2$ and $T_{skin}$, the calculation unit (8) derives the value of the perceived temperature ($T_p$) by interpolating in a two-input data table, stored in the same unit (8), in which the values of $T_p$ are reported corresponding to various values of $P_2$ and $T_{skin}$.

The construction of this table requires prior execution of measures to be carried out, one-time, in a laboratory equipped with:
 i) a climatic cell designed to create isothermal "reference environments" characterized by different temperatures within a range suitable for covering all the conditions of use of the sensor;
 ii) a sensitive element completely identical to said sensitive element (1) to which average power values are provided in a range suitable to cover all possible conditions of use (MET and environmental).

The temperature value provided by the above interpolation calculation in the table corresponds to the perceived temperature value $T_p$.

In order to communicate the value of $T_p$, the device object of the present invention preferably comprises means of communication to the user of the value of the perceived temperature ($T_p$) and, possibly, also of the values of ambient temperature and humidity measured by the sensitive element (3).

With reference to FIG. 4, said means may comprise a display (13) connected to the processing unit (8) of the sensor, or may include a wireless communication system, e.g. via wifi, bluetooth, zigbee, etc. (FIG. 4b), e.g. via wired serial network (FIG. 4c).

In an alternative embodiment shown in FIG. 5, the sensor object of the present invention can estimate the perceived temperature using a third sensitive element (2) which is completely identical to the sensitive element (1), in place of the calculation and interpolation in the table just described.

Said third sensitive element (2) is placed inside the sensor casing and therefore exposed to an environment having a temperature equal to that of the environment, isothermal walls with it and zero air velocity. The power value $P_2$ provided by equation 5 is supplied to the sensitive element (2). Conveniently the sensitive element (2) can share the same shunt resistance (5) with the sensitive element (1) and be activated with the PWM technique described above when the sensitive element (1) is not active, according to an alternation which is repeated with a constant period. The duration of the activations of the sensitive elements (1) and (2) must allow their thermal regulation, possibly accelerated by means of the algorithm previously illustrated. The temperature reached by the sensitive element (2) is used by the calculation means (8) to estimate the perceived temperature ($T_p$) through the following relations.

The heat exchange between the sensitive element (2) and the environment inside the sensor (isothermal environment at room temperature), can be described with a good approximation from the relationship:

$$P_2 = A \cdot h \cdot (T_{S2} - T_{aria}) \quad \text{(Eq. 6)}$$

where A is the heat exchange surface of said third sensitive element (2), identical to that of the first sensitive element (1), $T_{S2}$ is the temperature reached by said third sensitive element (2), while the heat exchange coefficient h is function of $T_{S2}$ and $T_{air}$.

The heat exchange coefficient h accounts for the conductive/convective and radiative heat exchanges in calm air for the sensor geometry, with the approximation of a linearization of the radiative exchanges in the temperature range between $T_{S2}$ and $T_{air}$, which is generally contained within a tens Kelvin degrees. As part of the approximation adopted with the equation 6, we can assume that, for the reference environment which would ensure to the sensitive element (1) the same thermal exchange observed in the real environment, the following relationship applies:

$$P_1 = A \cdot h \cdot (T_S - T_{percepita}) \quad \text{(Eq. 7)}$$

wherein $T_s$ is the temperature of the first sensitive element (1) and the coefficient h is the same that appears in equation (6). The approximation of constancy of the heat exchange coefficient h is acceptable because in both environments the air is calm and the walls are isothermal with the air. The second order errors, attributable to the dependence of h on the temperature of the heat exchange surface, can be neglected since the values of the temperatures that appear in equations 6 and 7 are never excessively different (in the ordinary operating ranges of the sensor object of the present invention $T_{S1}$ and $T_{S2}$ differ at most by 10° C.; a similar maximum difference can be recorded between $T_{air}$ and $T_{perceived}$).

By combining the relations 6 and 7, the following estimate is obtained for the perceived temperature:

$$T_p = T_{s1} - \frac{P_1}{P_2}(T_{s2} - T_{aria}) \quad \text{(Eq. 8)}$$

Figure 6:
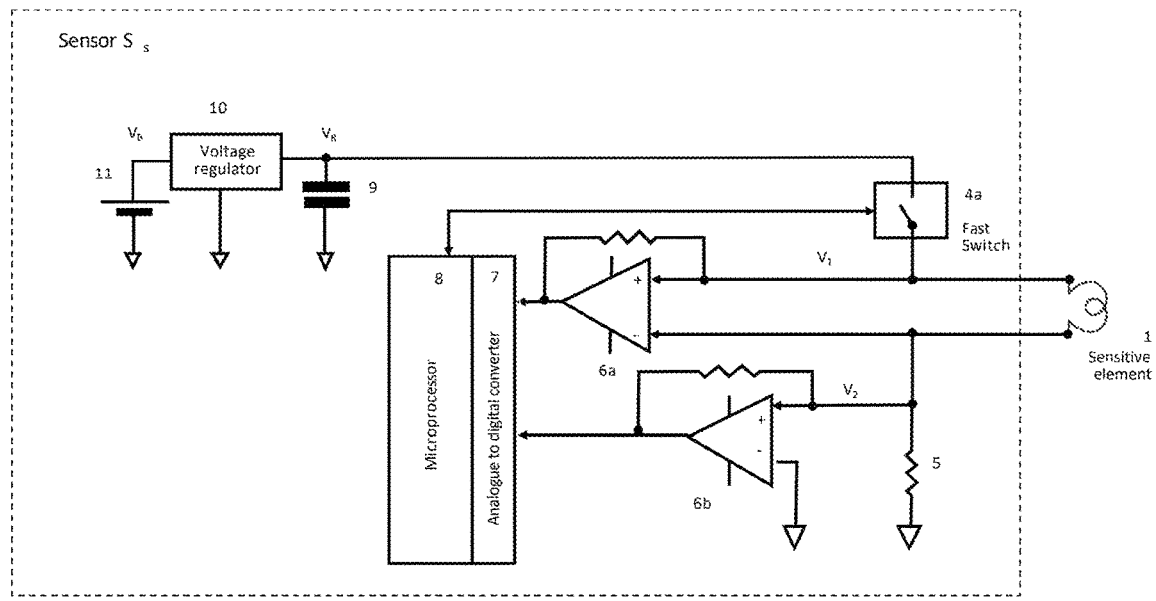
FIG. 6 shows an embodiment of the device through which it is possible to monitor the convective and radiant components in several points of a given room (or in several premises). To this end, a plurality of "slave" sensors (Ss) can be combined with the device S already described, each consisting of a simplification of the sensor S in which only the first sensitive element (1) is present, but both the second sensitive element (3) and the third sensitive element (2) are missing. These slave sensors (Ss) are able to supply the local temperatures of the skin without repeating the measurement of ambient temperature and humidity, delegated to the sensor S.
Figure 7:
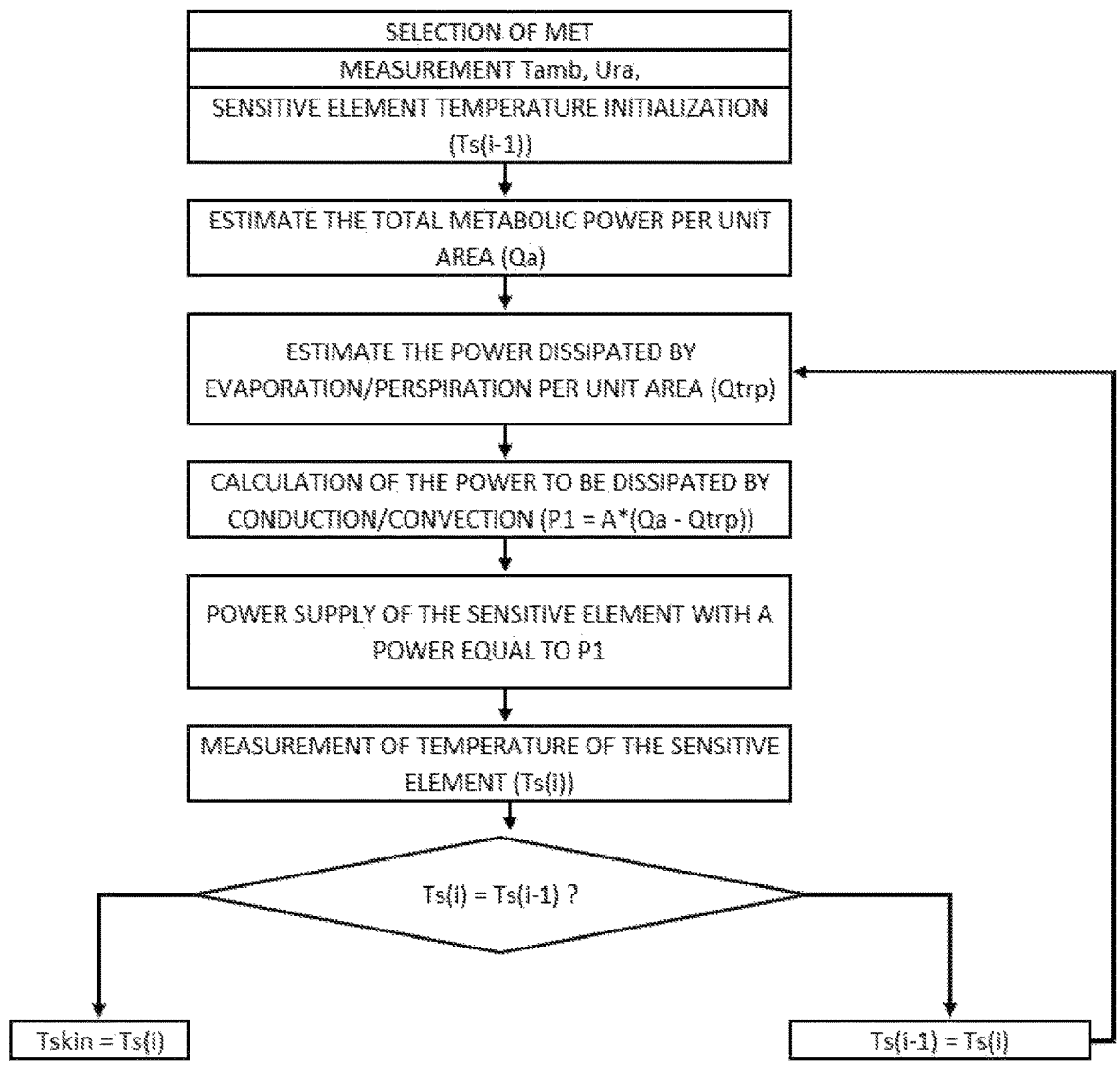
FIG. 7 shows the flow chart of the measurement procedure.
Figure 8:
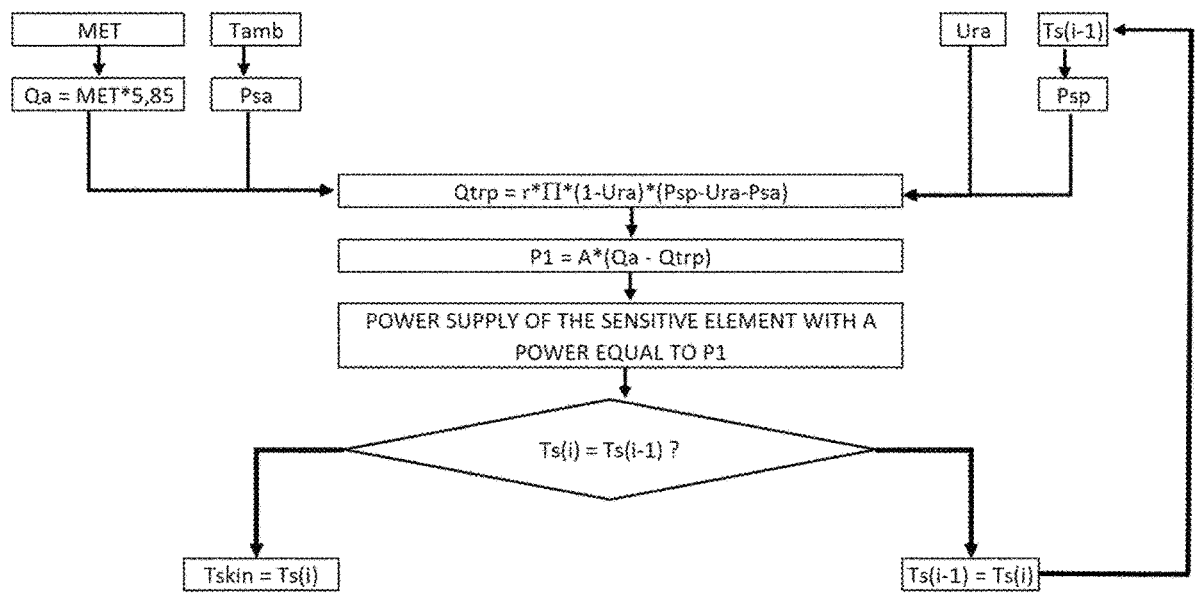
FIG. 8 shows the flow chart of the procedure, for determining the temperature of the skin (Tskin=Ts (i)), once the thermal regulation is completed and the iterative calculation converges, said sensitive element (1) reaches a temperature completely equivalent to the temperature that would be assumed by bare skin exposed to the same environmental conditions.

Conveniently with the device according to the present invention it is possible to monitor the convective and radiant components in several points of a given room (or in several premises). To this end, a plurality of "slave" sensors (Ss) can be combined with the device S already described, each consisting of a simplification of the sensor S in which only the first sensitive element (1) is present, but both the second sensitive element (3) and the third sensitive element (2) are missing, as indicated in FIG. 6.

These slave sensors (Ss) are able to supply the local temperatures of the skin without repeating the measurement of ambient temperature and humidity, delegated to the sensor S. The latter, in the case of several "slave" sensors, it provides for an appropriate average of the perceived temperatures as estimated by the sensors (Ss), using a weighing that can be possibly set by the user based on the relevance of the different environmental zones. Each sensor (Ss) must be equipped with a wireless communication unit suitable for transmitting the measurement data to the master sensor S.

In order to control the climate of multiple environments, it is expected to use a system of sensors, one of which is configured as a "master" (equipped with all the sensitive elements provided) and the other as "slave"; depending on the type of environments and the expected climatic conditions (for example in case of rooms with different enthalpy loads within the same building), the "slave" sensors can be equipped with all the sensitive elements (as in the case of the master) or only with necessary elements; depending on the type of system and associated actuators, the "slave" sensors can be used to control the local actuators (in wireless or wired mode), or send the measurement data to the "master sensor".

Conveniently, the device can include the mechanical protection of the sensitive element by means of a suitable metal grid, designed to allow air to flow freely and not to significantly obstruct the solid angle subtended by the sensor. The same metal grid can be used to create an electrostatic protection system against dust, by applying an electrostatic potential in which the metal grid and the sensitive element are connected to the negative pole, while a suitable metal ring placed around the sensor is connected to the positive pole. In this way, after having polarized or acquired a negative charge, the dust particles will preferentially be attracted to the positively charged ring and rejected by the sensitive element. The geometry of said metal protection can act as a casing for the entire device (including the power supply and control electronics of the sensitive element) and be shaped in such a way in order to allow the device to be connected to common power outlets or to common lamp holders, according to current standards.

This casing would make the device able to interact with equipment and machines (for example, plant terminals such as convectors, radiators, etc.) for the thermoregulation of environments in an integrated mode (sensor installed on the terminal) or remotely by using the most recent data transmission protocols (wireless, bluetooth, etc.). The device would then be compatible with the latest Smart Buildings management and monitoring technologies, contributing to energy efficiency and sustainability of buildings (Green Building), as the IoT technology, Big Data, Cloud computing and Monitoring, etc.

The invention claimed is:

1. A sensor (S) for measuring a perceived temperature of an environment comprising:
   at least one first sensitive element (1), configured to be exposed to the environment for which the perceived temperature is to be estimated, configured to be supplied with a variable power, so as to dissipate a thermal power equal to the power that would be dissipated by conduction, convection and radiation from any portion of human skin exposed to the same environment;

a device for measuring a temperature of said first sensitive element (1), a microcontroller (8), electrical supply means controlled by said microcontroller (8) and adapted to supply said first sensitive element (1) with an electrical power determined by said microcontroller (8);

at least one second sensitive element (3), configured to measure a temperature ($T_{amb}$) and relative humidity ($UR_a$) of the ambient air, said sensor (S) is characterized by:

said first sensitive element (1) consists of a thermo-resistance having a thin planar shape and configured to measure its own temperature by means of its Temperature Coefficient of Resistance (TCR);

and wherein:

said thermo-resistance consists of a metal element having a TCR greater or equal to a TCR of a metal element made of platinum and said thermo-resistance has any two sides directly facing the external environment;

and wherein said first sensitive element (1) is provided with a mechanical protection adapted to allow air to flow freely and not to significantly obstruct an angle subtended by the sensor (S) and wherein an electrostatic potential is applied to said mechanical protection so that it acts as an electrostatic protection system against dust.

2. The sensor (S) for measuring a perceived temperature of an environment according to claim 1, further comprising a selector (12) for selecting a value of metabolic activity (MET) for which to measure the perceived temperature and provides a customization of the metabolic rate.

3. The sensor (S) for measuring a perceived temperature of an environment according to claim 1, wherein said first sensitive element (1) has a surface/volume ratio in the range of 10 to 50 mm.

4. The sensor (S) for measuring a perceived temperature of an environment according to claim 1, wherein said first sensitive element (1) has a resistance value in the range of 1 to 100 ohms.

5. The sensor (S) for measuring a perceived temperature of an environment according to claim 1, wherein said first sensitive element (1) consists of a double polygonal spiral winding of a small section metal wire with a diameter between 0.10 and 0.05 mm.

6. The sensor (S) for measuring a perceived temperature of an environment according to claim 1, wherein said first sensitive element (1) is made from thin metal sheet with a thickness between 0.10 and 0.05 mm laser cut or sheared according to interdigital geometries to obtain a track conformation developed according to a serpentine-shape inside an insulating frame.

7. The sensor (S) for measuring a perceived temperature of an environment according to claim 1, wherein said first sensitive element (1) is integrated in a microelectronic system able to carry out all or part of the processing, using wire-bonding.

8. The sensor (S) for measuring the perceived temperature of an environment according to claim 1, wherein said electrical supply of the first sensitive element (1) is configured to provide a PWM (Pulse Width Modulation) technique to provide the first sensitive element (1) for a short period of time with a higher power than a required one, then repeating the operation after a period of time such that the mean power value is exactly the required one.

9. The sensor (S) for measuring the perceived temperature of an environment according to claim 1, wherein said microcontroller (8) is configured to carry out a closed-loop control based on the measurement of the temperature derivative of said first sensitive element (1) in order to accelerate thermal regulation.

10. The sensor (S) for measuring the perceived temperature of an environment according to claim 1, wherein said mechanical protection is configured to act as a casing for the entire sensor (S) so as to allow connection of the device to a power outlet or to a lamp holder.

11. The sensor (S) for measuring the perceived temperature of an environment according to claim 1, wherein said mechanical protection is also configured to make the device able to interact with equipment and machines for the thermoregulation of environments in an integrated mode or remotely by using wireless and/or Bluetooth protocols.

12. The sensor (S) for measuring the perceived temperature of an environment according to claim 1, further comprising a third sensitive element (2) mounted-inside a casing, configured so that said third sensitive element (2) is exposed to an additional environment having a temperature equal to that of the environment for which the perceived temperature is to be measured.

13. A method for measuring the perceived temperature of an ambient environment by means of a device according to claim 1, comprising the steps of:

(10) Measuring the ambient air temperature ($T_{amb}$) and the relative ambient humidity ($UR_a$) by means of the said second sensitive element (3);

(20) Estimating the total specific power ($Q_a$) dissipated by the skin as a function of the metabolic activity and as a function of the value set by a personalization capability (30) Estimating the specific power dissipated by the skin by evaporation/perspiration ($Q_{trp}$) as a function of:
the ambient temperature ($T_{amb}$) measured at point (10),
the relative ambient humidity ($UR_a$) measured in point (10),
the temperature ($T_s$) of said first sensitive element (1);

(40) Powering said first sensitive element (1) with a specific power equal to the difference between said specific powers ($Q_a$, $Q_{trp}$) calculated at points (10) and (20);

(50) Measuring the temperature ($T_s$ (i)) of said first sensitive element (1);

(60) Updating the estimate of said specific power dissipated through the skin by evaporation/perspiration ($Q_{trp}$) as a function of:
the ambient temperature ($T_{amb}$) measured at point (10),
the relative ambient humidity ($UR_a$) measured at point (10),
the temperature ($T_s$ (i)) of said sensitive element (1) measured at point (50), (70) Repeating steps (40) to (60) until the convergence of the value of said temperature ($T_s$ (i)) of said first sensitive element (1), thus determining the temperature of the skin ($T_{skin}=T_s$ (i));

(80) Estimating the specific power exchanged for evaporation/perspiration from the skin exposed to the reference environment ($Q_{trp2}$) as a function of:
the ambient temperature ($T_{amb}$) measured at point (10), the relative humidity assumed equal to 50%;

a skin temperature ($T_{skin}$) determined at point (70), (90) Determining the specific power ($P_2$) that would be dissipated in the reference environment by conduction, convection and irradiation as the difference between the specific powers ($Q_a$, $Q_{trp2}$) estimated at points (20) and (80), (100) Estimating the value of the perceived temperature ($T_p$) as a function of the specific power ($P_2$) calculated at point (90) and of said skin temperature ($T_{skin}$) calculated at point (70).

14. The method according to claim 13 wherein said estimate of the value of the perceived temperature ($T_p$) estimated at point (100) is calculated by obtaining the value of the perceived temperature ($T_p$) by interpolation in a two-input data table, stored in said microcontroller (8), which contains the values of the perceived temperature ($T_p$), corresponding to various values of the specific power ($P_2$) that would be dissipated by conduction, convection or radiation in the reference environment, and of the temperature of the skin ($T_{skin}$).

15. The method according to claim 14 wherein said sensor (S) further comprises a third sensitive element (2), constructed in the same manner as said first sensitive element (1) and located inside a casing configured to expose said third sensitive element (2) to an environment having a temperature equal to the room temperature, walls isothermal with air and zero air velocity in that said third sensitive element (2) is supplied with said specific power ($P_2$)

calculated at point (90)

and wherein said perceived temperature ($T_p$) is estimated through the relationship $$T_p = T_{s1} - \frac{P_1}{P_2}(T_{s2} - T_{air}).$$

16. A device comprising the sensor (S) according to claim 1 and comprising a plurality of "slave" sensors ($S_s$), each comprising only the first sensitive element (1), wherein said slave sensor (Ss) is configured to supply local temperatures by delegating the measurement of ambient temperature and humidity to the sensor (S), which carries out an average of perceived temperatures as estimated by the slave sensors ($S_s$) and configured to provide a mediated value in output.

* * * * *